(12) United States Patent
van Rotterdam et al.

(10) Patent No.: US 8,719,305 B1
(45) Date of Patent: May 6, 2014

(54) OBJECT TYPE DEFINITIONS

(75) Inventors: Jeroen van Rotterdam, Berkeley, CA (US); Mark Polman, Rotterdam (NL)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/174,751

(22) Filed: Jun. 30, 2011

(51) Int. Cl.
*G06F 7/00* (2006.01)
*G06F 17/30* (2006.01)

(52) U.S. Cl.
USPC .......................................................... 707/793

(58) Field of Classification Search
USPC ......................................... 707/793, 791, 802
See application file for complete search history.

(56) References Cited

U.S. PATENT DOCUMENTS

| | | | |
|---|---|---|---|
| 5,297,284 A | 3/1994 | Jones et al. | |
| 6,092,079 A | 7/2000 | Gerard et al. | |
| 7,331,014 B2 * | 2/2008 | Relyea et al. | 715/713 |
| 7,426,690 B1 | 9/2008 | Little et al. | |
| 7,437,374 B2 * | 10/2008 | Chen et al. | 1/1 |
| 7,487,515 B1 | 2/2009 | Jones et al. | |
| 7,516,447 B2 * | 4/2009 | Marvin et al. | 717/140 |
| 7,516,449 B2 | 4/2009 | Agrawal | |
| 7,526,471 B2 * | 4/2009 | Dettinger et al. | 1/1 |
| 7,890,543 B2 * | 2/2011 | Hunt et al. | 707/803 |
| 8,311,975 B1 * | 11/2012 | Gonsalves | 707/606 |
| 2002/0073091 A1 | 6/2002 | Jain et al. | |
| 2002/0198885 A1 * | 12/2002 | Streepy, Jr. | 707/100 |
| 2005/0172265 A1 * | 8/2005 | Brigham et al. | 717/120 |
| 2005/0234934 A1 | 10/2005 | Mackay et al. | |
| 2006/0167880 A1 * | 7/2006 | Meijer et al. | 707/9 |
| 2006/0259911 A1 * | 11/2006 | Weinrich et al. | 719/315 |
| 2007/0038642 A1 | 2/2007 | Durgin et al. | |
| 2008/0120129 A1 * | 5/2008 | Seubert et al. | 705/1 |
| 2008/0201351 A1 | 8/2008 | Lammel | |
| 2009/0064196 A1 * | 3/2009 | Richardson et al. | 719/327 |
| 2009/0205013 A1 * | 8/2009 | Lowes | 726/1 |
| 2010/0083219 A1 * | 4/2010 | Tavares et al. | 717/107 |

* cited by examiner

*Primary Examiner* — Robert Beausoliel, Jr.
*Assistant Examiner* — Nicholas Allen
(74) *Attorney, Agent, or Firm* — Theodore A. Chen; Krishnendu Gupta

(57) ABSTRACT

A method, article of manufacture, and apparatus for managing a cloud computing environment. In some embodiments, this includes creating an event configuration, wherein the event configuration determines the order in which event handlers of a trait are called, identifying a java class configuration, wherein the java class configuration determines the composition of an instance of an object, identifying a set of required traits, and storing the event configuration, the java class configuration, and the set of required traits in an XML document.

5 Claims, 11 Drawing Sheets

```xml
<?xml version="1.0" encoding="UTF-8"?>
<document xmlns="http://www.emc.com/ngis/core/typesystem/def"
xmlns:xlink="http://www.w3.org/1999/xlink" objectID="0000000000008004">
    <myapp:content xmlns:myapp="http://www.example.com/"
typename="content"
typenamespace="http://www.emc.com/ngis/traits/base" version="1">
        <content version="1">
            <mimetype>application/pdf</mimetype>
            <size>200000</size>
            <fileref xlink:href="link/to/some/file/here"/>
            <filename>junglebook.pdf</filename>
        </content>
    </myapp:content>
  <yourapp:authoring xmlns:yourapp="http://www.test.com/"
typename="authoring"
typenamespace="http://www.emc.com/ngis/traits/base" version="1">
        <authoring version="2">
            <lastModifiedDate>2006-05-04T18:13:51.0Z</lastModifiedDate>
            <lastModifier xlink:href="0000000000000000"/>
            <creationDate>2006-05-04T18:13:51.0Z</creationDate>
            <creatorRef xlink:href="http://www.oxygenxml.com/"/>
        </authoring>
    </yourapp:authoring>
</document>
```

FIG. 1

```xml
<?xml version="1.0" encoding="UTF-8"?>
<type-definition
xmlns="http://www.emc.com/documentum/cs/core/typesystem/def"
xmlns:xlink="http://www.w3.org/1999/xlink" version="1"
        objectID="0000000000009006">
    <type-definition version="1">
        <name>document</name>
        <definition-version>1</definition-version>
        <namespace>http://www.ecm.com/typesystem/def</namespace>
        <class-configuration>com.objects.core.Document</class-configuration>
        <events>
            <event name="Create">
                <trait
namespace="http://www.emc.com/documentum/cs/core/typesystem/def"
name="Authoring"/>
                <trait
namespace="http://www.emc.com/documentum/cs/core/typesystem/def"
name="Content"/>
                <!-- ... -->
            </event>
            <event name="Delete">
                <trait
namespace="http://www.emc.com/documentum/cs/core/typesystem/def"
name="Content"/>
                <trait
namespace="http://www.emc.com/documentum/cs/core/typesystem/def"
name="Authoring"/>
                <!-- ... -->
            </event>
        </events>
    </type-definition>
</type-definition>
```

FIG. 2

```xml
<?xml version="1.0" encoding="UTF-8"?>
<trait-definition
xmlns="http://www.emc.com/documentum/cs/core/typesystem/def"
xmlns:xlink="http://www.w3.org/1999/xlink" version="2"
          objectID="0000000000008010">
     <trait-definition version="1">
          <name>authoring</name>
<namespace>http://www.emc.com/documentum/cs/core/typesystem/def</namespace>
          <definition-version>2</definition-version>
          <class-configuration>com.emc.documentum.cs.core.typesystem.impl.AuthoringImpl</class-configuration>
          <upgrade when="inBackground"/>
          <events>
               <event name="Create" handler="com.emc.documentum.cs.core.typesystem.impl.CreateHandler" />
    <event name="Delete" handler="com.emc.documentum.cs.core.typesystem.impl.DeleteHandler" />
               <event name="Update" handler="com.emc.documentum.cs.core.typesystem.impl.UpdateHandler" />
               <event name="Upgrade" handler="com.emc.documentum.cs.core.typesystem.impl.AuthoringUpgradeToVersion2"/>
          </events>
          <root-element>authoring</root-element>
     </trait-definition>
</trait-definition>
```

FIG. 4

```xml
<?xml version="1.0" encoding="UTF-8"?>
<xs:schema elementFormDefault="qualified"
xmlns="http://www.emc.com/documentum/cs/core/typesystem/def"
xmlns:xs="http://www.w3.org/2001/XMLSchema"

targetNamespace="http://www.emc.com/documentum/cs/core/typesystem/def
" xmlns:xlink="http://www.w3.org/1999/xlink">
 <xs:include schemaLocation="../core.xsd"/>

<xs:complexType name="Authoring">
  <xs:complexContent>
   <xs:extension base="RootTrait">
    <xs:sequence>
     <xs:element name="authors" minOccurs="0">
      <xs:complexType>
       <xs:sequence>
        <xs:element name="author" maxOccurs="unbounded">
         <xs:complexType>
          <xs:choice>
           <xs:element name="user" type="UserRef"/>
           <xs:element name="person">
            <xs:complexType>
             <xs:group ref="personGroup"/>
            </xs:complexType>
           </xs:element>
          </xs:choice>
         </xs:complexType>
        </xs:element>
       </xs:sequence>
      </xs:complexType>
     </xs:element>
     <xs:element name="lastModifiedDate" type="xs:dateTime" minOccurs="0"/>
     <xs:element name="lastModifier" minOccurs="0">
      <xs:complexType>
       <xs:sequence>
        <xs:element name="user" type="UserRef"/>
       </xs:sequence>
      </xs:complexType>
     </xs:element>
     <xs:element name="creationDate" type="xs:dateTime" minOccurs="0"/>
     <xs:element name="creator" minOccurs="0">
```

FIG. 7

```
      <xs:complexType>
        <xs:sequence>
          <xs:element name="user" type="UserRef"/>
        </xs:sequence>
      </xs:complexType>
    </xs:element>
   </xs:sequence>
  </xs:extension>
 </xs:complexContent>
</xs:complexType>

<xs:element name="authoring" type="Authoring"/>
</xs:schema>
```

FIG. 7 – Continued

OBJECT TYPE DEFINITIONS

CROSS REFERENCE TO RELATED APPLICATIONS

This application is related to co-pending U.S. patent application Ser. No. 13/174,170 for DYNAMIC DATA STRUCTURES and filed concurrently herewith, which is incorporated herein by reference for all purposes; and to co-pending U.S. patent application Ser. No. 13/174,746 for TRAIT DEFINITIONS and filed concurrently herewith, which is incorporated herein by reference for all purposes.

FIELD OF THE INVENTION

This invention relates generally to data systems, and more particularly to systems and methods for organizing data in data systems.

BACKGROUND OF THE INVENTION

Increasingly, software solutions are being required to define a data model by end users rather than by programmers. Conventional databases typically have rigid data models. A programmer may create a data item, or object, and define certain parameters of the object.

When using the object, a user must use the same data model that the programmers defined. For example, if a programmer created an object to include three services, but the user only wanted to use one, the object would still call all three services.

Not only is this a waste of resources, but the user is frustrated by being provided services that he or she did not desire.

There is a need, therefore, for an improved method, article of manufacture, and apparatus for organizing data in data systems.

BRIEF DESCRIPTION OF THE DRAWINGS

The present invention will be readily understood by the following detailed description in conjunction with the accompanying drawings, wherein like reference numerals designate like structural elements, and in which:

FIG. 1 illustrates a data object in accordance with some embodiments.

FIG. 2 illustrates a data type definition in accordance with some embodiments.

FIG. 4 illustrates a trait definition in accordance with some embodiments.

FIG. 7 illustrates a scheme for the authoring trait in accordance with some embodiments.

DETAILED DESCRIPTION

Figure 3:
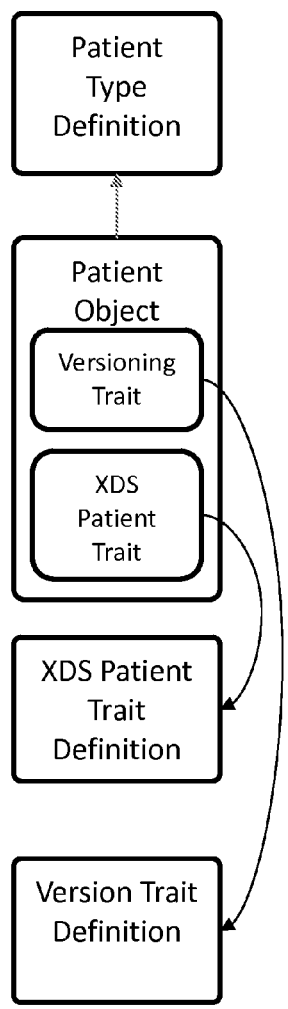
FIG. 3 illustrates an object in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Traditional databases, or content management systems, have rigid definitions of data objects. Conventional data objects typically inherit lots of meta data and functionality, even if they're not required or used. Total cost of ownership (TCO) per object is relatively high, and the offered functionality is set in stone.

The enhanced techniques described herein allow for dynamic definitions of data objects, or data structures. FIG. 1 illustrates a data object in accordance with some embodiments. The object in FIG. 1 is a "document" object with a "content" trait and an "authoring" trait. The object holds data related to some file that may be stored elsewhere in the system. The "content" trait groups data concerning that file (mimetype, size, file reference, file name), while the "authoring" trait groups data concerning the authoring process of the file (last modified date, last modifier, creation date, creator).

Traits are data definitions designed to be added, at runtime, to a data structure, such as an object. In the example in FIG. 1, the authoring trait and the content trait are data definitions that are added to the document object at runtime. A trait definition defines the data model, but a trait may also expose services and methods. Adding traits to objects during runtime allows for a flexible database model without the need to define a rigid database structure upfront.

Objects and traits each have a type. Object types may be defined in an XML document, and object type definitions may include a name, a namespace, and a version. FIG. 2 illustrates a data type definition in accordance with some embodiments.

The type definition in FIG. 2 defines the name as "document" in the http://www.ecm.com/typesystem/def namespace. The version of this definition is 1. Further data type definitions may include event configuration, Java class configuration, and a set of required traits. For example, in FIG. 2, the Java class configuration is com.objects.core.Document. On retrieval of an object of this type, a com.objects.core.Document Java object is instantiated and represents this object in the JVM. The object's document is provided to the instantiation. This allows implementation to setup a binding between the XML document and the Java object representing the object. The type definition in FIG. 2 also includes event configuration. For example, on a "Create" event, the handler on the authoring trait precedes the handler of the content trait. Conversely, on a "Delete" event, the handler on the content trait precedes the one on the authoring trait. In some embodiments, it may be preferable to set restrictions on the object, such as defining which traits can be added to the object.

Figure 10:
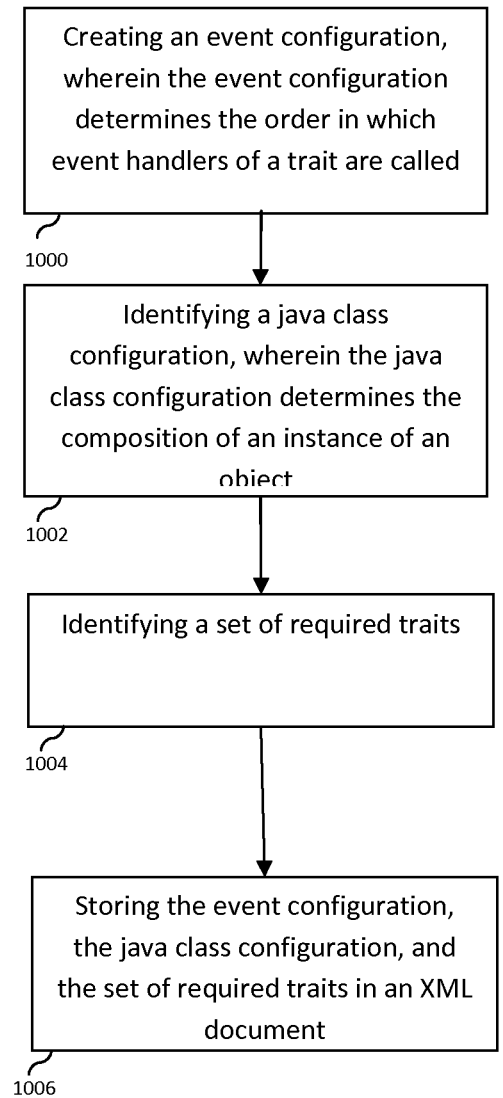
FIG. 10 is a flowchart of a method to organize data in accordance with some embodiments.

FIG. 10 illustrates a method to organize data in accordance with some embodiments. In step 1000, an event configuration is created, wherein the event configuration determines the order in which event handlers of a trait are called. In step 1002, a java class configuration is identified, wherein the java class configuration determines the composition of an instance of an object. In step 1004, a set of required traits is identified. In step 1006, the event configuration, java class configuration, and the set of required traits are stored in an XML document.

In some embodiments, objects themselves contain almost no data and contain no traits. However, in some embodiments, object type definitions may include a set of required traits. A required trait definition may include the name of the trait, the type of the trait, and a property name. The name of the trait is the key to retrieve the instance in the object. The property name is used to generate a getter method in the generated class of the object type.

FIG. 3 illustrates an object in accordance with some embodiments. The patient object includes a base trait and a customer trait. The base trait and the customer trait may be required traits for the patient object. In other words, every instance of the patient object necessarily has these two traits. As illustrated by FIG. 3, each trait provides a different set of services and handles a different set of events. Each trait also inherits a different set of metadata. When the patient object is instantiated, it will call the base trait and a customer trait. Depending on user preference, other traits may be called.

Figure 9:
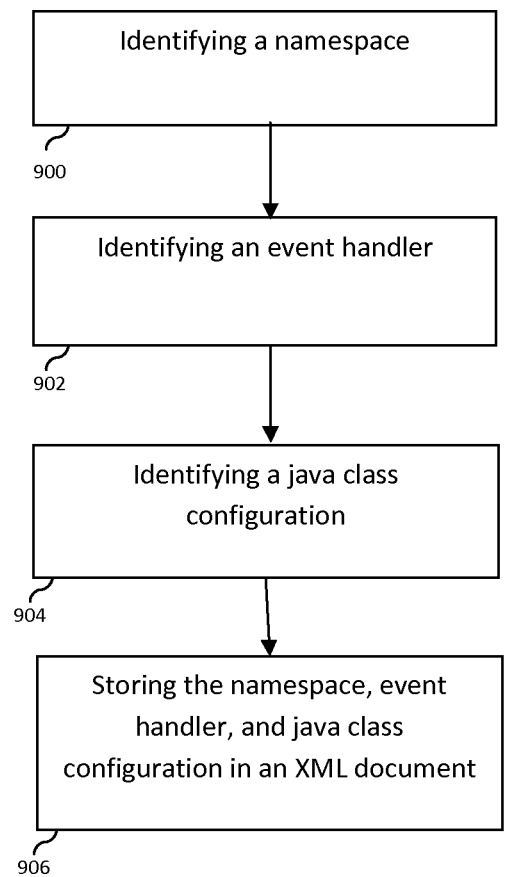
FIG. 9 is a flowchart of a method to organize data in accordance with some embodiments.

FIG. 9 illustrates a method to organize data in accordance with some embodiments. In step 900, a namespace is identified. In step 902, an event handler is identified. In step 904, a java class configuration is identified. In step 906, the namespace, event handler, and java class configuration are stored in an XML document. In other words, a trait definition has been created.

Although a user may add or remove traits from an object at runtime based on user preference, in some embodiments, it may be preferable to restrict or constrain traits for an object. For example, if an administrator of a database did not want users to be able to add a wide range of traits to an object (may be due to possible performance issues, among others), the administrator may define object types to limit the amount of traits that may be added to an object, may restrict certain traits to certain objects, or may restrict certain traits from certain objects.

FIG. 3 also illustrates a trait definition for each trait. FIG. 4 illustrates a trait definition in accordance with some embodiments. This trait definition defines the name as authoring (e.g. used by the document object in FIG. 1) in its namespace (e.g. between <namespace>). The version of this definition is 2. Traits of this type include handlers for Create, Delete, and Update events. On retrieval of a trait of this type, a Java object of <class-configuration> type will be instantiated representing the trait in the JVM. Similarly, when a Create event is raised on this trait, a Java object of " . . . CreateHandler" is instantiated that handles the Create event. Traits, in some embodiments, may also include a schema. A schema may be used for validation of a trait at runtime, and may be referred to by the trait definition through an xsdref element. FIG. 7 illustrates a scheme for the authoring trait in accordance with some embodiments.

Figure 5:
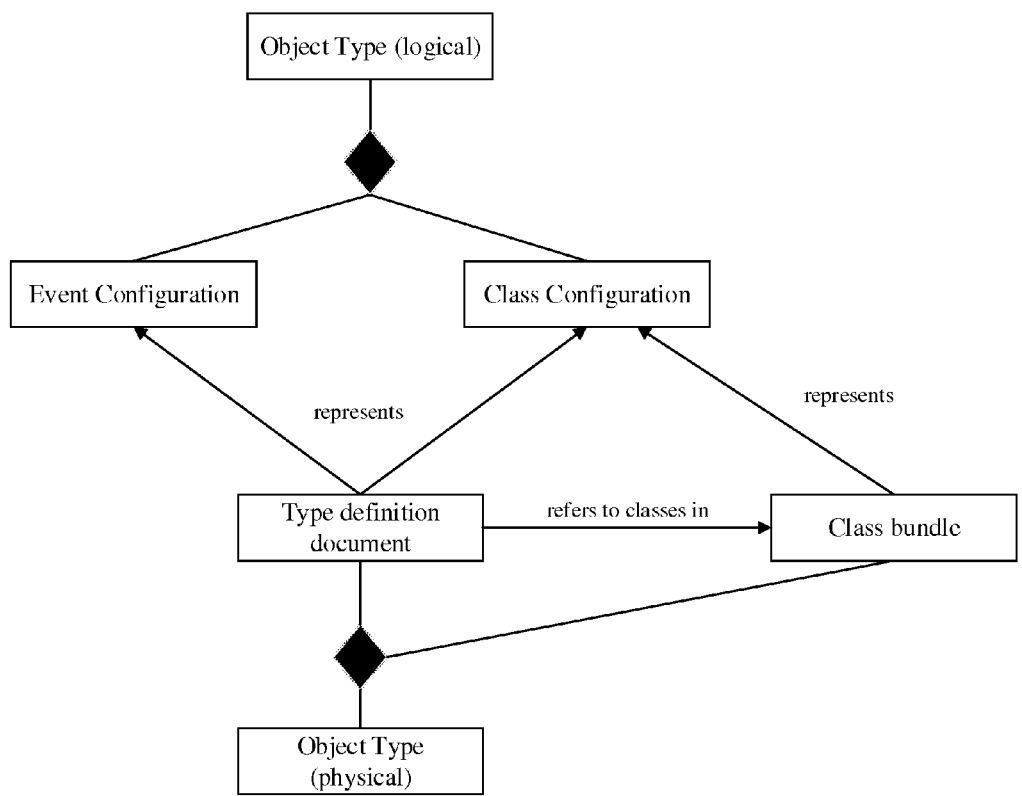
FIG. 5 illustrates the relationship between physical object type, and its logical representation.
Figure 6:
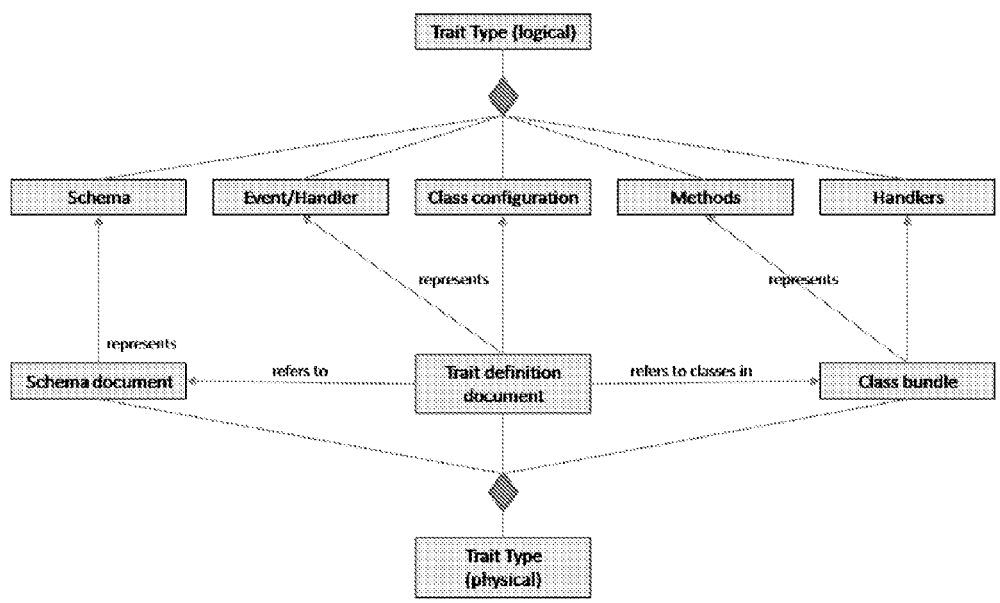
FIG. 6 illustrates the relationship between physical trait type and its logical representation.

FIG. 5 illustrates the relationship between physical object type, and its logical representation. Similarly, FIG. 6 illustrates the relationship between physical trait type and its logical representation.

Figure 8:
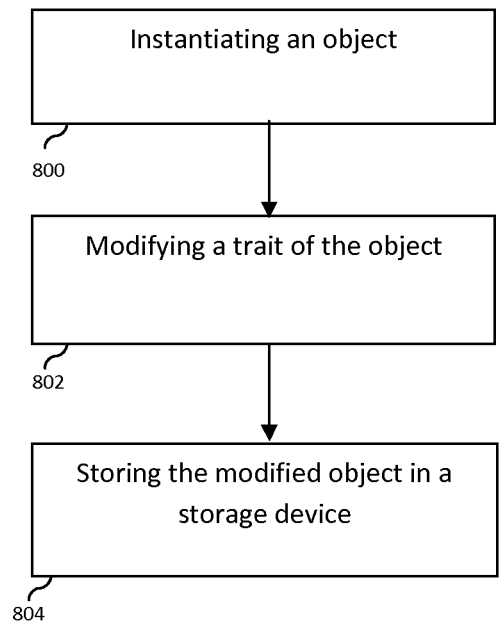
FIG. 8 is a flowchart of a method to organize data in accordance with some embodiments.

FIG. 8 illustrates a method to organize data in accordance with some embodiments. In step 800, an object is instantiated. In step 802, a trait of the object is modified. In step 804, the modified object is stored in a storage device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for organizing data, the method comprising:
creating an event configuration, wherein the event configuration determines the order in which event handlers of a trait are called;
identifying a java class configuration, wherein the java class configuration determines the composition of an instance of an object;
identifying a set of required traits, wherein a required trait in the set of required trait is associated with a known schema and wherein the known schema associated with the required trait is used to validate the required trait at runtime;
identifying a set of restricted traits; and storing the event configuration, the java class configuration, the set of restricted traits and the set of required traits in an XML document.

2. The method as recited in claim 1, wherein the set of required traits may be no traits.

3. The method as recited in claim 1, further comprising identifying a set of allowable traits.

4. A system for organizing data, comprising an XML document, and a processor configured to:
- create an event configuration, wherein the event configuration determines the order in which event handlers of a trait are called;
- identify a java class configuration, wherein the java class configuration determines the composition of an instance of an object;
- identify a set of required traits, wherein a required trait in the set of required trait is associated with a known schema and wherein the known schema associated with the required trait is used to validate the required trait at runtime;
- identify a set of restricted traits; and
- store the event configuration, the java class configuration, the set of restricted traits and the set of required traits in an XML document.

5. A computer program product for organizing data, comprising a non-transitory computer readable medium having program instructions embodied therein for:
- creating an event configuration, wherein the event configuration determines the order in which event handlers of a trait are called;
- identifying a java class configuration, wherein the java class configuration determines the composition of an instance of an object;
- identifying a set of required traits, wherein a required trait in the set of required trait is associated with a known schema and wherein the known schema associated with the required trait is used to validate the required trait at runtime;
- identifying a set of restricted traits; and
- storing the event configuration, the java class configuration, the set of restricted traits and the set of required traits in an XML document.

* * * * *